United States Patent
Miki et al.

(10) Patent No.: US 6,218,325 B1
(45) Date of Patent: Apr. 17, 2001

(54) FIBER-REINFORCED CERAMIC GREEN BODY AND SINDERED CERAMIC ARTICLE OBTAINED THEREFROM

(75) Inventors: Yuuji Miki; Atsushi Koizumi; Naoki Itoh, all of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/093,638

(22) Filed: Jun. 9, 1998

(30) Foreign Application Priority Data

Aug. 11, 1997 (JP) .................................................. 9-228909

(51) Int. Cl.[7] .................................................. C04B 35/80
(52) U.S. Cl. ........................ 501/95.1; 501/95.2; 501/97.1; 501/97.2; 501/97.3
(58) Field of Search ................................... 501/95.1, 95.2, 501/97.1, 97.2, 12, 97.3; 264/640, 641, 683

(56) References Cited

U.S. PATENT DOCUMENTS

| | | |
|---|---|---|
| 5,087,399 | 2/1992 | Neil et al. . |
| 5,306,678 | * 4/1994 | Yoshida et al. .................... 501/95.2 |
| 5,376,599 | * 12/1994 | Oshima et al. ........................ 501/90 |
| 5,518,673 | * 5/1996 | Yeckley ............................... 501/97.1 |
| 5,543,371 | * 8/1996 | Katayama et al. ................... 501/97.1 |
| 5,599,867 | 2/1997 | Ito et al. . |
| 5,662,731 | 9/1997 | Andersen et al. . |
| 5,663,218 | 9/1997 | Chappuis . |
| 5,690,724 | 11/1997 | Hester et al. . |
| 5,789,075 | * 8/1998 | Frenk et al. ............................ 501/12 |
| 5,866,027 | * 2/1999 | Frank et al. ............................ 501/12 |

FOREIGN PATENT DOCUMENTS

| | | |
|---|---|---|
| 0436220 | 7/1991 | (EP) . |
| 61-6172 | 1/1986 | (JP) . |
| 1-238905 | 9/1989 | (JP) . |
| 5505588 | 8/1993 | (JP) . |
| 7267737 | 8/1993 | (JP) . |
| 733534 | 2/1995 | (JP) . |

OTHER PUBLICATIONS

Chemical Abstracts; 105:28740 CA, "Manufacture of Porous Ceramic Article", Takeuchi et al., Mar. 1986.*

* cited by examiner

Primary Examiner—Karl Group
(74) Attorney, Agent, or Firm—Birch, Stewart, Kolasch & Birch, LLP (57) ABSTRACT

A fiber-reinforced ceramic green body having enough green strength and handling strength. The fiber-reinforced ceramic green body is obtained by molding a ceramic composition comprising a ceramic powder, a sintering aid powder, an organic fiber, an aqueous dispersion medium and an optional dispersant. The organic fiber is contained in the ceramic green body in an amount of 0.2–3 parts by weight based on 100 parts by weight of a total of the ceramic powder and the sintering aid powder and uniformly dispersed throughout it. The average length of the organic fiber is 300–1000 $\mu$m and the average diameter is 2.5–30 $\mu$m. The organic fiber is preferably a synthetic high polymer such as polyester, nylon, etc., and preferably has a hydrophilic nature imparted by surface treatment.

14 Claims, 9 Drawing Sheets

FIBER-REINFORCED CERAMIC GREEN BODY AND SINDERED CERAMIC ARTICLE OBTAINED THEREFROM

BACKGROUND OF THE INVENTION

The present invention relates to a fiber-reinforced ceramic green body and a sintered ceramic article each having a high mechanical strength and a high ability to be recycled.

A slip casting method is one of the well-known methods for manufacturing green bodies, in which a slip composition (aqueous dispersion or slurry including a ceramic powder) is poured into a cavity within a mold usually made of a water-absorbing material such as plaster (gypsum), etc., and then the water component of the slip composition is absorbed by the mold to form a green body. The green body thus obtained is sintered to provide a final sintered ceramic article for practical use. The slip casting method is suitable generally for producing a ceramic green body having a complicated shape. In slip casting a slip composition, an organic binder such as polyamide, carboxymethylcellulose, methylcellulose, polyvinyl alcohol, etc. is usually added to the slip composition as disclosed in Japanese Patent Laid-Open No. 61-6172 to improve the dry strength of the green bodies. However, since the use of the organic binder results in a large shrinkage of the green body, cracking is likely to occur in the green body during releasing it from the mold or during drying it.

Alternatively, it has been proposed to add an inorganic fiber to the slip composition. For example, Japanese Patent Laid-Open No. 5-505588 teaches to add glass whiskers, and Japanese Patent Laid-Open No. 7-267737 adds inorganic fibers of aluminum oxide, silicon nitride, etc. However, the inorganic fiber is left in the ceramic article even after the sintering process and affects the properties of the final sintered ceramic article. Therefore, the type of the inorganic fiber to be suitably usable and the addition amount thereof is limited.

Further, prior to adding the inorganic fiber, a pretreatment such as pulverization, classification, etc. for making the length and diameter of the inorganic fiber uniform is required. In addition, the use of the inorganic fiber involves a problem of generating noxious dusts of the inorganic fiber and a problem of decreasing the ability to recycle defective green bodies because the inorganic fiber is difficult to be removed from the defective green bodies.

OBJECT AND SUMMARY OF THE INVENTION

Accordingly, an object of the present invention is to provide a fiber-reinforced ceramic green body having a high green strength and a high ability of recycling defective green bodies, and a sintered ceramic article manufactured by sintering the fiber-reinforced ceramic green body.

As a result of the intense research in view of the above objects, the inventors have found that the addition of a specific organic fiber to a ceramic powder improves the green strength of a resultant ceramic green body and also increases the ability of recycling the defective green bodies. The present invention has been accomplished based on this finding.

Thus, in an aspect of the present invention, there is provided a fiber-reinforced ceramic green body containing an organic fiber which is uniformly dispersed throughout the green body. In another aspect of the present invention, there is provided a sintered ceramic article manufactured by sintering the above fiber-reinforced ceramic green body.

DETAILED DESCRIPTION OF THE INVENTION

The present invention will be described below in detail.

[1] Ceramic Composition

A ceramic composition for producing the fiber-reinforced ceramic green body of the present invention is basically a mixture of a ceramic powder and an organic fiber. To facilitate the sintering of a green body, it is preferred to add a sintering aid to the ceramic composition. When the fiber-reinforced ceramic green body is produced by the slip casting method, the ceramic composition preferably contains a dispersant. In the following description, the present invention will be described in detail by using a silicon nitride powder as the ceramic powder.

(a) Silicon Nitride Powder

In the present invention, either α-silicon nitride powder a β-silicon nitride powder may be used. Both the silicon nitride powders may be produced by a direct nitridation of Si, a reduction and subsequent nitridation of silica, a thermal decomposition of silicon diimide, a vapor phase reaction of $SiH_4+NH_3+N_2$, etc. The average particle size of the silicon nitride powder is preferably 0.01–3 μm, and more preferably 0.1–1.3 μm. The specific surface area is preferably 9–13 $m^2/g$.

(b) Sintering Aid Powder

As the sintering aid powder to be blended with the silicon nitride powder, exemplified are powders of $Al_2O_3$, $Y_2O_3$, $Yb_2O_3$, $HfO_2$, AlN, MgO, compounds of IIIa elements of the Periodic Table, etc. The average particle size of the sintering aid powder is preferably 0.1–8 μm, and more preferably 0.3–5 μm. The specific surface area is preferably 1–15 $m^2/g$.

The addition amount of the sintering aid powder is preferably 0.5–15 parts by weight, and more preferably 1–5 parts by weight based on 100 parts by weight of a total of the silicon nitride powder and the sintering aid powder. The addition of the sintering aid powder of less than 0.5 parts by weight provides an insufficiently densified sintered ceramic article, and the high temperature strength of the sintered ceramic article is deteriorated when the addition amount exceeds 15 parts by weight.

(c) Organic Fiber

The organic fiber usable in the present invention is a synthetic high polymer fiber such as fibers of nylon, polyester, etc. and a natural high polymer fiber such as ramie, cellulose, etc. Of the above organic fibers, the synthetic high polymer fiber such as fibers of nylon, polyester, etc. is preferable. Nylon (polyamide) and polyester usable in the present invention are not restricted to a specific nylon and polyester, and may exemplified by nylon 6(polycapramide), nylon 66, (poly(hexamethyleneadipamide)) polyethylene terephthalate (PET), etc.

The average diameter of the organic fiber is preferably 2.5–30 μm, and more preferably 2.5–20 μm. When the average diameter is less than 2.5 μm, the viscosity of a ceramic slurry is too high, and -consequently the formation of the green body becomes difficult.

Organic fibers having an average diameter larger than 30 μm not only deteriorates the mechanical strength of the resultant sintered ceramic article but also provides a defective green body.

The average length of the organic fiber is preferably 300–1000 μm, and more preferably 300–700 μm. When the average length is less than 300 μm, the organic fiber will not exhibit a sufficient effect of reinforcing the resultant green body. An average length exceeding 1000 μm is undesirable because the organic fiber will cause the viscosity of the slurry to be extremely high, and thus detrimentally making the formation of the green body very difficult.

The amount of the organic fiber to be added is preferably 0.2–3 parts by weight, and more preferably 0.2–1 part by weight based on 100 parts by weight of a total of the silicon nitride powder and the sintering aid powder. When the addition amount is less than 0.2 part by weight, the organic fiber will not exhibit a sufficient effect for reinforcing the resultant green body. An addition amount exceeding 3 parts by weight is undesirable because the organic fiber will not uniformly disperse throughout the slurry, thus resulting in a loss of strength of both the green body and the sintered ceramic article and providing defective green bodies.

The organic fiber may be used without pretreatment. However, in view of facilitating a uniform dispersion of the organic fiber throughout the slurry, it is preferred to improve the hydrophilic nature of the surface thereof by subjecting the organic fiber to a surface treatment such as plasma treatment, etc. prior to the use.

In manufacturing the green body by the slip casting method, a dispersant is preferably added to the slurry to ensure a uniform dispersion of the ceramic powder and the organic fiber throughout the slurry. The addition amount of the dispersant is preferably 0.05–0.5 part by weight, and more preferably 0.1–0.3 part by weight based on 100 parts by weight of a total of the silicon nitride powder and the sintering aid powder. When the addition amount is less than 0.05 part by weight, no effect of adding the dispersant will be obtained. An addition amount exceeding 0.5 part by weight will detrimentally cause the viscosity of the slurry to be too high.

(e) Aqueous Dispersion Medium

The aqueous dispersion medium such as water, etc. is mixed with the above ingredients in an amount preferably 35–50 parts by weight, more preferably 40–43 parts by weight based on 100 parts by weight of a total of the silicon nitride powder and the sintering aid powder. When the amount is less than 35 parts by weight, the slurry will be less flowable. An amount exceeding 50 parts by weight will cause the viscosity of the slurry to be too low, thus requiring an excessively long period of time for draining the aqueous dispersion medium or drying the resultant green body.

[2] Production Method of Green Body

The production method of the green body will be described while referring to the slip casting method. However, it should be construed that the production method is not limited thereto and the fiber-reinforced ceramic green body of the present invention may be manufactured by other methods known in the art.

First, the silicon nitride powder, the sintering aid powder and the optional dispersant are added to the aqueous dispersion medium and mixed in a ball mill, etc. at 15–30° C. until a homogeneous mixture is obtained. Then, the organic fiber is added to the homogeneous mixture and mixed at 15–30° C. until the organic fiber is uniformly dispersed throughout the mixture to form a slurry. The mixing time is preferably 2 hours or longer. When the mixing time is less than 2 hours, the organic fiber will not be uniformly dispersed in the slurry. The mixing time is more preferably 10–16 hours because a more preferable result is obtained in both the uniform dispersion and the dispersion efficiency. The viscosity of the slurry thus obtained is preferably 0.01–0.2 Pa·s at 25° C.

The slurry thus prepared is poured into a mold made of a water-absorbing and water-permeable material such as plaster, and maintained in the mold at 15–30° C. for 1–4 hours to drain the aqueous dispersion medium. After the completion of casting the ceramic powder, the green body is released from the mold and dried sufficiently at 120–150° C. for 10–30 hours. Since the organic fiber imparts enough green strength and handling strength to the green body, there occurs no spalling and cracking in the green body during the draining process, mold releasing process and drying process. In the manner described above, the ceramic green body including the reinforcing organic fiber uniformly dispersed therein is obtained.

[2] Production Method of Sintered Ceramic Article

The sintered ceramic article (sintered ceramic body) is produced by sintering the green body preferably subsequent to a degreasing process, at 550–650° C. for 1–5 hours and a calcination process at 1300–1700° C. for 0.5–8 hours. The sintering process may be carried out at 1750–1950° C. for 1–8 hours in an inert atmosphere such as nitrogen gas under a pressure of 2–2000 kgf/cm². The sintered ceramic article (ceramic body) thus produced has a bending strength of 400–900 MPa.

The present invention will be further described while referring to the following Examples which should be considered to illustrate various preferred embodiments of the present invention.

EXAMPLES 1 and 2

(1) Preparation of Slurry

Figure 1:
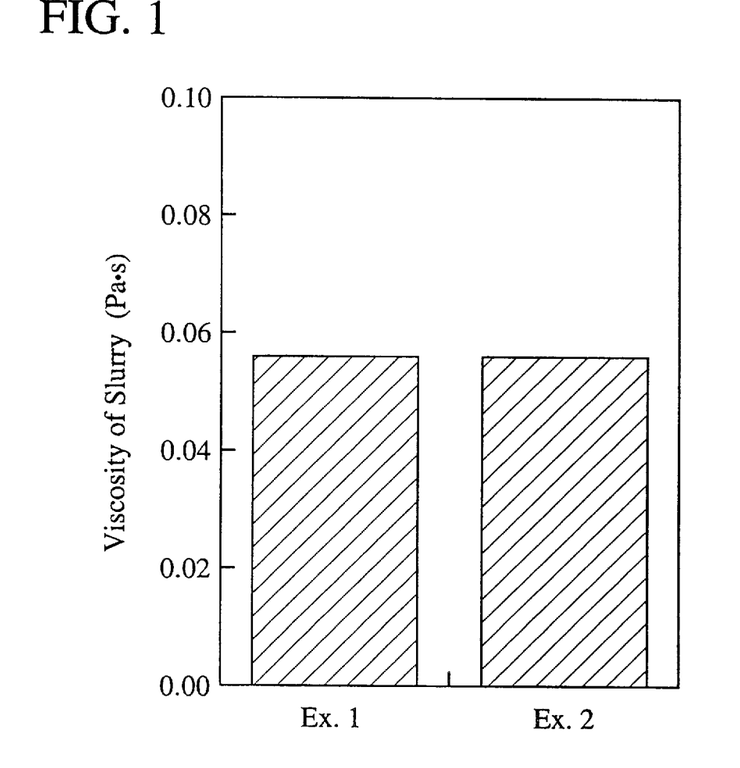
FIG. 1 is a graphical representation showing the viscosity of each slurry in Examples 1–2.

To a 100-weight part mixture of 96.5 parts by weight of silicon nitride powder (average particle size: 0.4 $\mu$m; specific surface area: 10.6 m²/g) and a sintering aid powder mixture consisting of 2.5 parts by weight of $Y_2O_3$ powder (average particle size: 5.0 $\mu$m; specific surface area: 3.0 m²/g) and 1.0% by weight of $Al_2O_3$ powder (average particle size: 0.4 $\mu$m; specific surface area: 7.0 m²/g), 43 parts by weight of distilled water and 0.18 part by weight of a dispersant (SN Dispersant 7347C) were added. The resultant mixture was pulverized in a ball mill for 64 hours with 200 parts by weight of silicon nitride balls as a grinding medium to obtain a homogeneous mixture. Then, after adding each of the organic fibers shown in Table 1 to the homogeneous mixture, the mixing was further continued for 2 hours to prepare respective slurry. The viscosity measured at 25° C. on each slurry is shown in FIG. 1. The viscosity was measured by an E-type viscometer (2.5 rpm) manufactured by Tokyo Keiki Co. As seen from FIG. 1, each of the slurries of Examples 1 and 2 had a viscosity suitable for manufacturing the ceramic green body.

TABLE 1

| Example No. | Organic Fiber | Average Diameter ($\mu$m) | Average Length ($\mu$m) | Addition Amount (parts by weight) |
|---|---|---|---|---|
| 1 | PET[1] | 7.2 | 500 | 0.4 |
| 2 | Nylon[2] | 7.9 | 500 | 0.4 |

[1]polyethylene terephthalate
[2]Nylon 66

(2) Occurrence of Cracking

Figure 2:
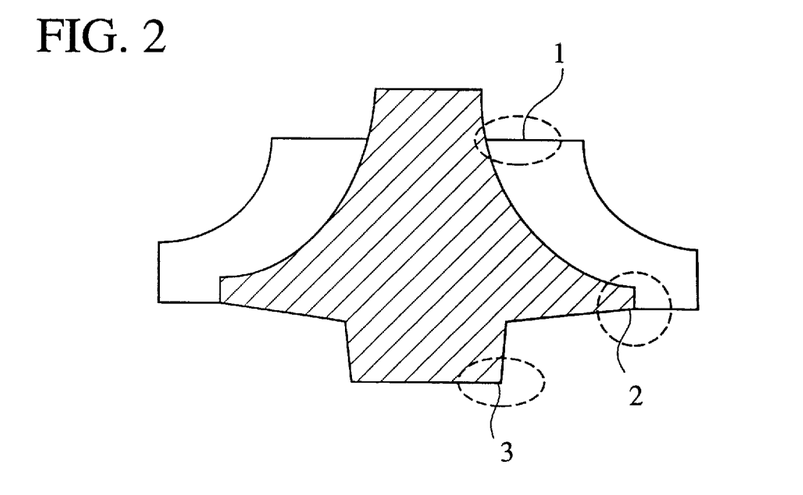
FIG. 2 is a schematic sectional view showing a radial turbine model to which the present invention is applied.

Each of the slurry obtained above was slip cast in a plaster mold, as shown in FIG. 2, which was designed to produce a radial turbine model, and dried at 180° C. for 16 hours to obtain each fiber-reinforced ceramic green body. The fiber-reinforced ceramic green a bodies were examined on the occurrence of cracking at the wing portion 1, the paddle portion 2 and the hub portion 3, and the degree of cracking was judged by the following criterion. The results are shown in Table 2.

⊚: No Cracking,
○: Observed in up to three places,
Δ: Observed in four or five places, and
x: Observed in entire part.

The fiber-reinforced ceramic green bodies were embedded in molecular sieves, thereafter, heated to 600° C. at a rate of 50° C./hour and maintained at 600° C. for 3 hours to degrease the fiber-reinforced ceramic green bodies. Then, after embedded in BN powder, the degreased green bodies were heated slowly to 1400° C. and calcined at 1400° C. for one hour. The same examination with respect to the occurrence of cracking as above was repeated at the wing, paddle and hub portions of the degreased bodies and the calcined bodies. The results are shown in Table 2.

TABLE 2

| | Green Body | | | Degreased Body | | | Calcined Body | | |
|---|---|---|---|---|---|---|---|---|---|
| Ex. No. | Wing | Paddle | Hub | Wing | Paddle | Hub | Wing | Paddle | Hub |
| 1 | ⊚ | ⊚ | ⊚ | ○ | ⊚ | ⊚ | ○ | ⊚ | ⊚ |
| 2 | ⊚ | ⊚ | ⊚ | ○ | ⊚ | ⊚ | ○ | ⊚ | ⊚ |

As seen from Table 2, little cracking was observed, and the bodies were confirmed to be suitable for practical use.

(3) Strength of Sintered Ceramic Article

Figure 3:
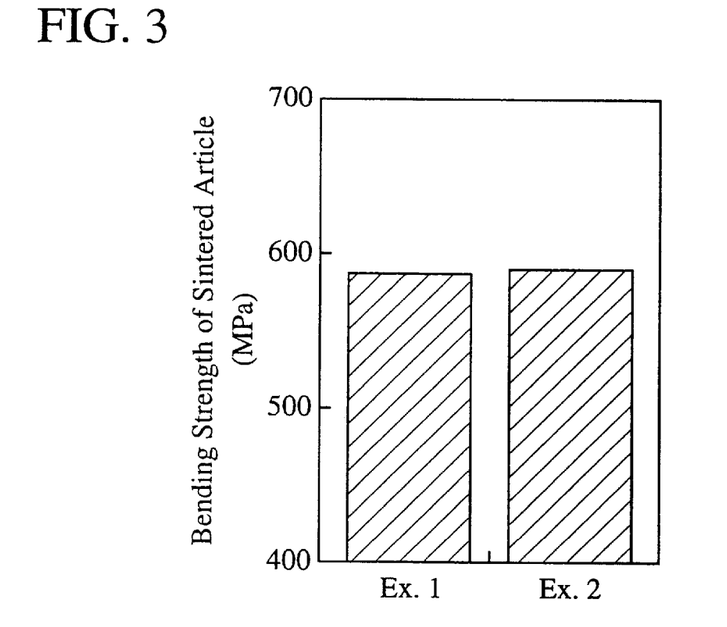
FIG. 3 is a graphical representation showing the bending strength of each sintered ceramic article in Examples 1–2.

Each of the slurries was slip cast in a plaster mold to obtain each green body with a dimension of 40 mm×5 mm×4 mm. The green bodies were air-dried, heated to 600° C. at a rate of 50° C./hour and maintained at 600° C. for 3 hours to degrease the green bodies. After calcining the degreased body in the same manner as in (2), the calcined body was sintered at 1900° C. for 4 hours in nitrogen atmosphere under a pressure of 9.5 kgf/cm². The sintered bodies were subjected to a three-point bending test. The test was carried out by loading each sintered body, while supported by tow supports spaced 30 mm apart, at the mid-point between the supports. The bending strength was calculated from the measured load required to cause each sintered body to fracture. The results are shown in FIG. 3. As seen from FIG. 3, the sintered bodies of Examples 1–2 including the reinforcing organic fiber had enough strength for practical use.

EXAMPLE 3 and COMPARATIVE EXAMPLE 1

(1) Preparation of Slurry

Figure 4:
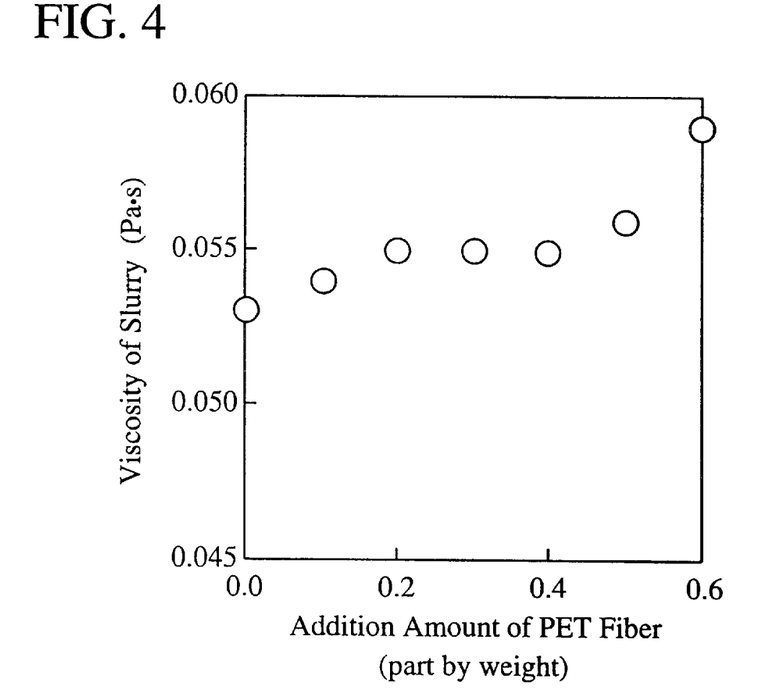
FIG. 4 is a graphical representation showing the dependency of the slurry viscosity on the addition amount of PET fiber in Example 3 and Comparative Example 1.

Each slurry was prepared in the same manner as in Example 1 except for adding PET fiber in an amount from 0.1 to 0.6 part by weight. Also, as a comparison, a slurry containing no organic fiber was prepared (Comparative Example 1). The viscosity of each slurry was measured in the same manner as in Example 1. The results are shown in FIG. 4. As seen from FIG. 4, although the viscosity of the slurry slightly increased with increasing addition amount of PET fiber, the moldability of each slurry was not affected.

(2) Evaluation of Moldability

Figure 5:
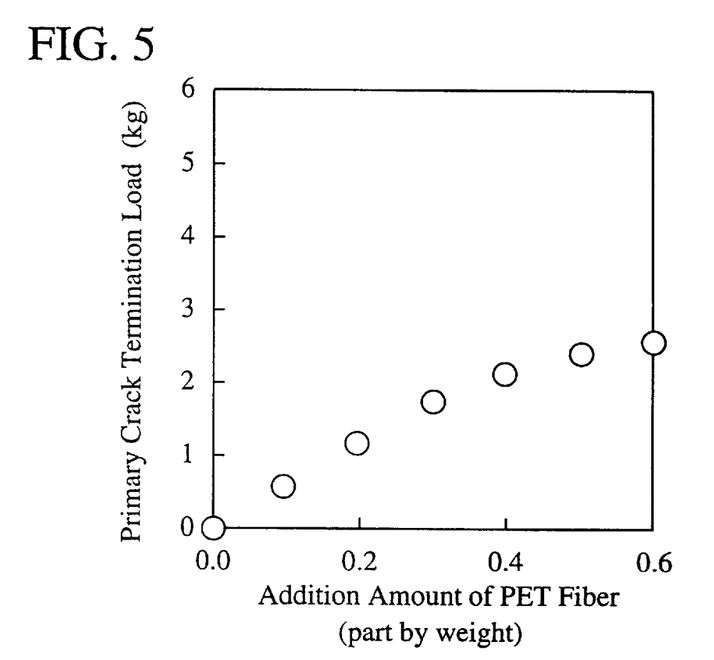
FIG. 5 is a graphical representation showing the dependency of the primary crack termination load on the addition amount of PET fiber in Example 3 and Comparative Example 1.

Each green body with a dimension of 100 mm×10 mm×10 mm was prepared by slip casting each slurry obtained above in a plaster mold in the same manner as in Example 1. The green bodies were subjected to a rupture test (same three-point bending test as above except for changing the distance between the supports to 50 mm) to determine a primary crack termination load. The primary crack termination load referred to herein is a load at temporary termination of crack propagation during the rupture test and indicative of crack resistance for evaluating the moldability. The results are shown in FIG. 5. As seen from FIG. 5, when the addition amount of PET fiber is less than 0.2 weight part, the primary crack termination load is low and the moldability is poor.

(3) Occurrence of Cracking

In the same manner as in Example 1, the green bodies, degreased bodies and calcined bodies were examined with respect to occurrence of cracking at the wing, paddle and hub portions. The results are shown in Table 3. As seen from Table 3, a significant amount of cracks was observed in the wing portion of the calcined body when the addition amount was 0.1 part by weight. This may be considered due to the propagation of the microcracks formed during the molding process.

TABLE 3

Relationship between Addition Amount of PET Fiber and Occurrence of Crack

| Addition Amount (wt. part) | Green Body | | | Degreased Body | | | Calcined Body | | |
| --- | --- | --- | --- | --- | --- | --- | --- | --- | --- |
| | Wing | Paddle | Hub | Wing | Paddle | Hub | Wing | Paddle | Hub |
| 0.1 | ○ | ◎ | ◎ | △ | ◎ | ○ | X | ◎ | △ |
| 0.2 | ◎ | ◎ | ◎ | △ | ◎ | ○ | △ | ◎ | △ |
| 0.3 | ◎ | ◎ | ◎ | △ | ◎ | ◎ | △ | ◎ | ○ |
| 0.4 | ◎ | ◎ | ◎ | ○ | ◎ | ◎ | ○ | ◎ | ◎ |
| 0.5 | ◎ | ◎ | ◎ | ○ | ◎ | ○ | ○ | ◎ | ○ |
| 0.6 | ◎ | ◎ | ◎ | ○ | ◎ | ○ | ○ | ◎ | ○ |

(4) Strength of Sintered Ceramic Article

Figure 6:
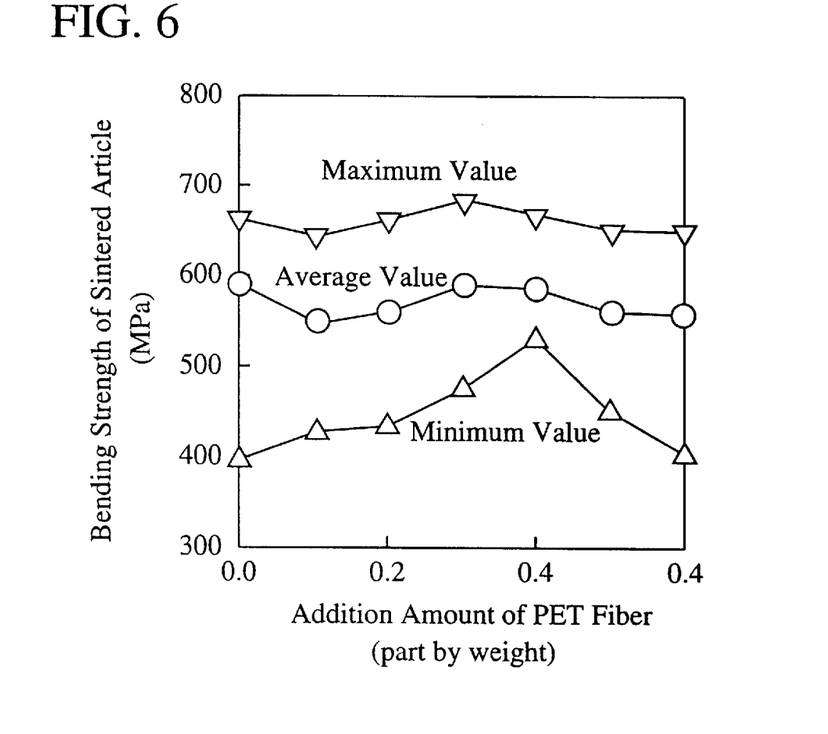
FIG. 6 is a graphical representation showing the dependency of the bending strength of the sintered ceramic article on the addition amount of PET fiber in Example 3 and Comparative Example 1.

The three-point bending test was repeated several times on sintered ceramic articles produced from the slurries in the same manner as in Example 1(3). The average values, maximum values and minimum values of the measured three-point bending strength are shown in FIG. 6. As seen from FIG. 6, the decreased addition amount of PET fiber tends to decrease the minimum bending strength of the sintered ceramic article.

EXAMPLE 4

(1) Preparation of Slurry

Figure 7:
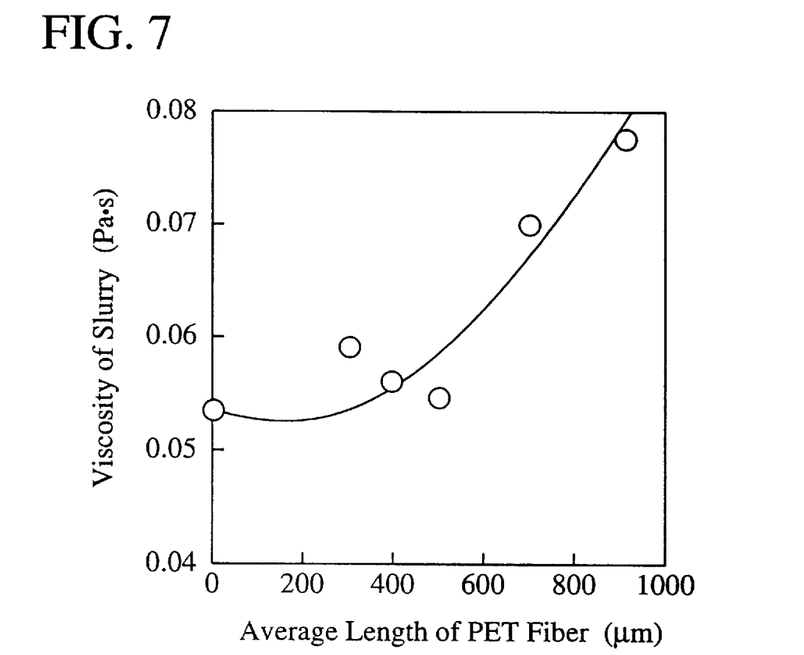
FIG. 7 is a graphical representation showing the dependency of the slurry viscosity on the average length of PET fiber in Example 4.

Each slurry was prepared in the same manner as in Example 1 except for adding PET fiber having an average length form 300 to 900 μm. The viscosity of each slurry was measured in the same manner as in Example 1. The results are shown in FIG. 7 together with the viscosity of Comparative Example 1. As seen from FIG. 7, the viscosity of the slurry abruptly increased when the average length exceeded 1000 μm, thus deteriorating the moldability of the slurry.

(2) Evaluation of Moldability

Figure 8:
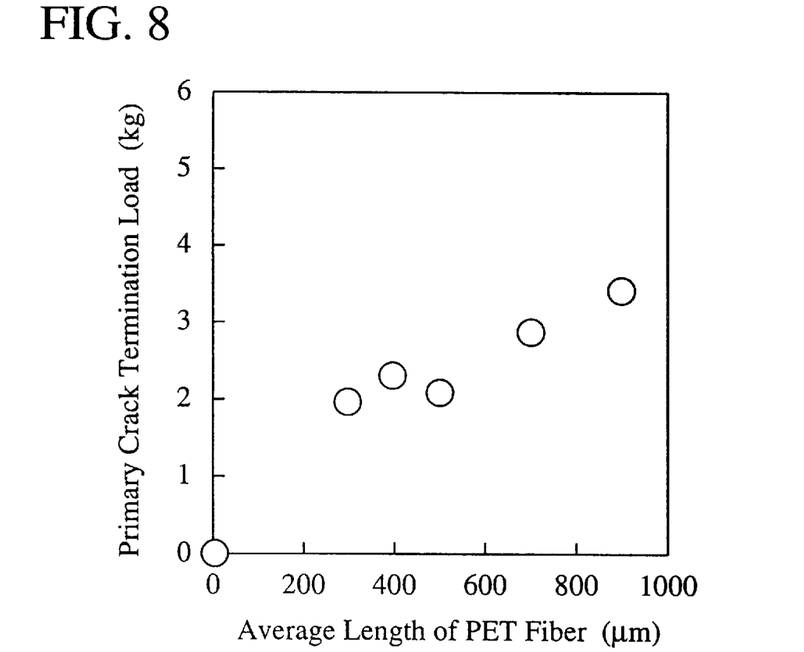
FIG. 8 is a graphical representation showing the dependency of the primary crack termination load on the average length of PET fiber in Example 4.

Each green body with a dimension of 100 mm×10 mm×10 mm was prepared by slip casting each slurry in a plaster mold in the same manner as in Example 1. The green bodies were subjected to a rupture test to determine a primary crack termination load in the same manner as in Example 3. The results are shown in FIG. 8. As seen from FIG. 8, the green bodies added with PET fiber having an average length of 300–700 μm showed a significantly increased primary crack termination load as compared with Comparative Example 1 added with no PET fiber.

(3) Occurrence of Cracking

Each slurry was slip cast in a plaster mold designed to produce radial turbine model in the same manner as in Example 1. The green bodies were degreased and calcined in the same manner as in Example 1. The green bodies, degreased bodies and calcined bodies were examined with respect to occurrence of cracking at the wing, paddle and hub portions in the same manner as in Example 1. The results are shown in Table 4.

TABLE 4

Relationship between Average Length of PET Fiber and Occurrence of Crack

| Average Length (μm) | Green Body | | | Degreased Body | | | Calcined Body | | |
| --- | --- | --- | --- | --- | --- | --- | --- | --- | --- |
| | Wing | Paddle | Hub | Wing | Paddle | Hub | Wing | Paddle | Hub |
| 300 | ◎ | ◎ | ◎ | ◎ | ◎ | ◎ | ○ | ◎ | △ |
| 400 | ◎ | ◎ | ◎ | ◎ | ◎ | ◎ | ○ | ◎ | △ |
| 500 | ◎ | ◎ | ◎ | ○ | ◎ | ◎ | ○ | ◎ | ◎ |
| 700 | ◎ | ◎ | ◎ | ○ | ◎ | ◎ | △ | ◎ | ◎ |

(4) Strength of Sintered Ceramic Article

Figure 9:
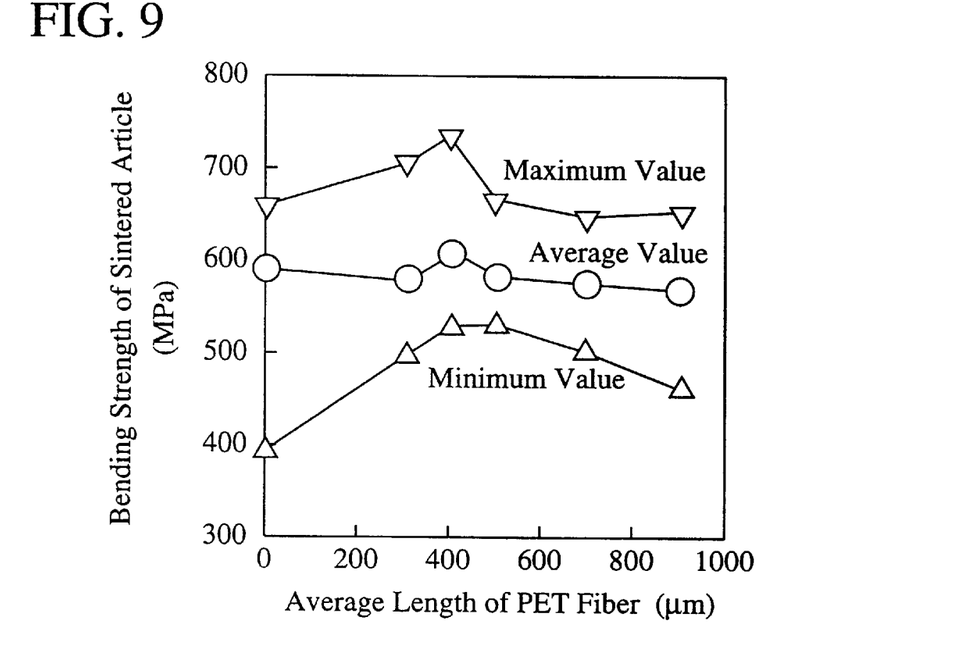
FIG. 9 is a graphical representation showing the dependency of the bending strength of the sintered ceramic article on the average length of PET fiber in Example 4.

The three-point bending test was repeated several times on sintered ceramic articles produced from the slurries in the same manner as in Example 1(3). The average values, maximum values and minimum values of the measured three-point bending strength are shown in FIG. 9. When the average length exceeds 1000 μm, the minimum bending strength extremely decreased.

EXAMPLE 5

(1) Preparation of Slurry

Figure 10:
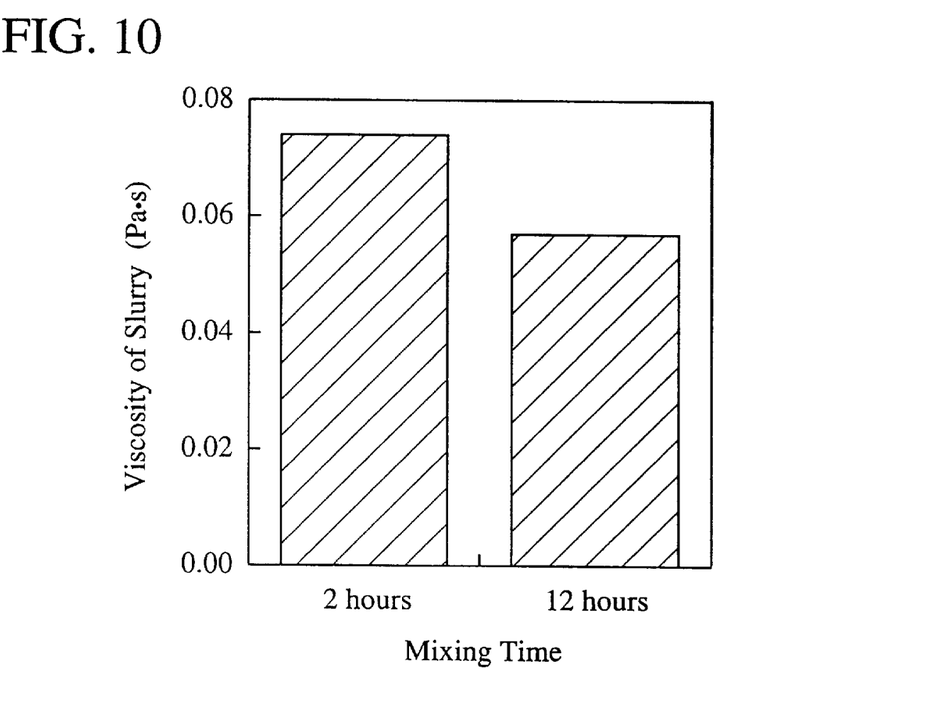
FIG. 10 is a graphical representation showing the dependency of the slurry viscosity on the mixing time in Example 5.

Each slurry was prepared in the same manner as in Example 1 except for mixing PET fiber (average diameter: 5.5 μm; average length: 500 μm) for 2 hours or 12 hours. The viscosity of each slurry was measured in the same manner as in Example 1. The results are shown in FIG. 10. As seen from FIG. 10, the viscosity of the slurry decreased with increasing mixing time.

(2) Evaluation of Moldability

Figure 11:
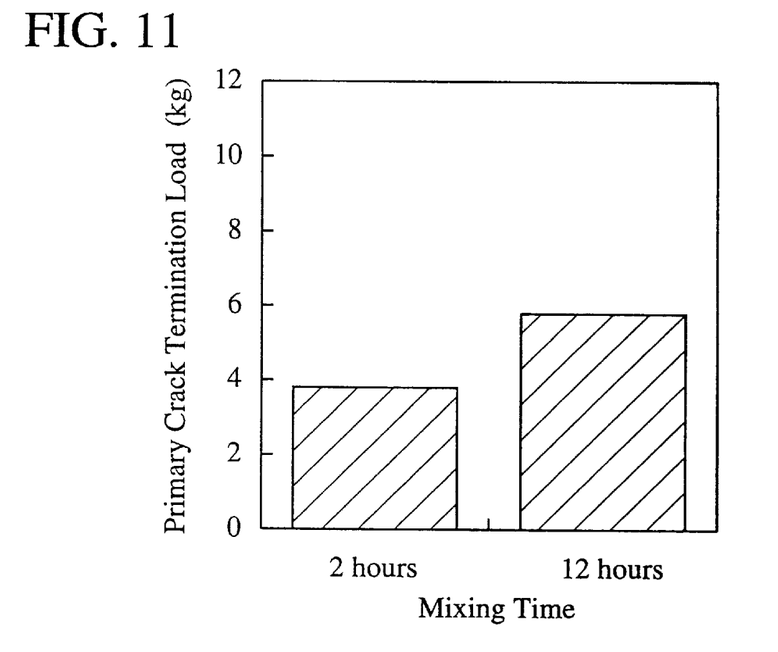
FIG. 11 is a graphical representation showing the dependency of the primary crack termination load on the mixing time in Example 5.

Each green body with a dimension of 100 mm×10 mm×10 20 mm was prepared by slip casting each slurry in a plaster mold in the same manner as in Example 1. The green bodies were subjected to the rapture test to determine a primary crack termination load. The results are shown in FIG. 11. As seen from FIG. 11, the primary crack termination load increased with increasing mixing time, thus improving the moldability.

EXAMPLE 6

(1) Preparation of Slurry

Figure 12:
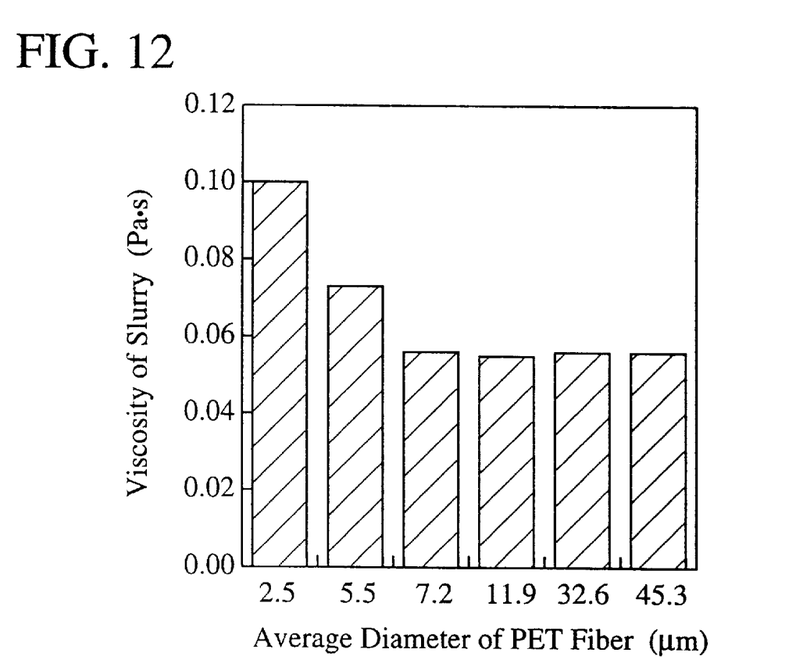
FIG. 12 is a graphical representation showing the dependency of the slurry viscosity on the average diameter of PET fiber in Example 6.

Each slurry was prepared in the same manner as in Example I except for adding PET fiber having an average diameter from 2.5 to 45.3 μm. The mixing time was 12 hours for the average diameters of 2.5 μm and 5.5 μm, and 2 hours for the average diameter of 7.2 μm, 11.9 μm, 32.6 μm and 45.3 μm. The viscosity of each slurry was measured in the same manner as in Example 1. The results are shown in FIG. 12. As seen from FIG. 12, the viscosity of the slurry decreased with increasing average diameter of PET fiber.

(2) Evaluation of Moldability

Figure 13:
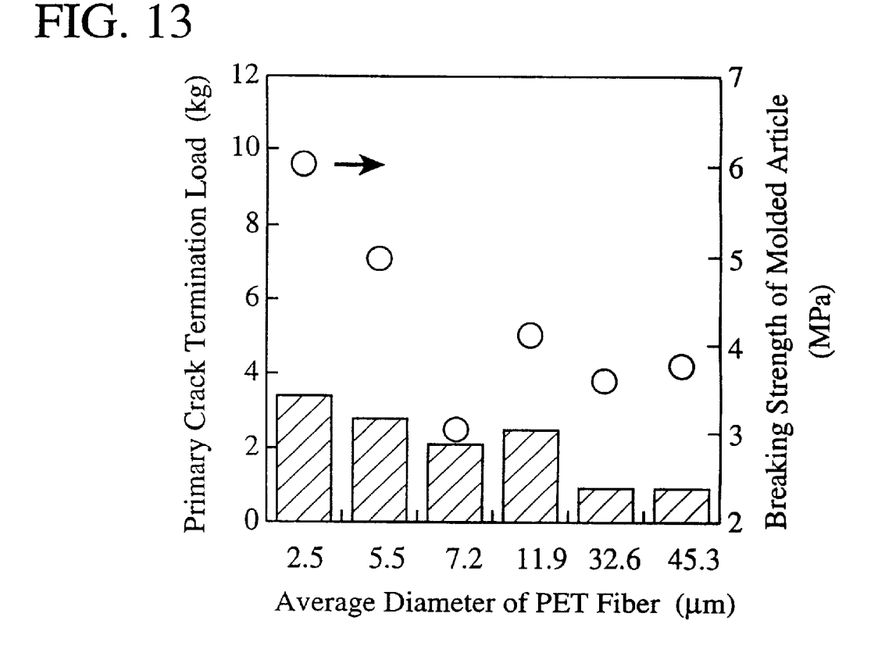
FIG. 13 is a graphical representation showing the dependency of the primary crack termination load on the average diameter of PET fiber in Example 6.

Each green body with a dimension of 100 mm×10 mm×10 mm was prepared by slip casting each slurry in the same manner as in Example 1. The green bodies were subjected to the rupture test to determine a primary crack termination load and a breaking strength. The results are shown in FIG. 13. As seen from FIG. 13, both the primary crack termination load and the breaking strength decreased with increasing average diameter of PET fiber.

(3) Occurrence of Cracking

Each slurry was slip cast in a plaster mold designed to produce radial turbine model in the same manner as in Example 1. The green bodies were degreased and calcined in the same manner as in Example 1. The green bodies, degreased bodies and calcined bodies were examined with respect to occurrence of cracking at the wing, paddle and hub portions in the same manner as in Example 1. The results are shown in Table 5. As seen from Table 5, the amount of crack in the degreased bodies and the calcined bodies remarkably increased when the average diameter of PET fiber exceeded 30 μm.

TABLE 5

Relationship between Average Diameter of PET Fiber and Occurrence of Crack

| Average Diameter (μm) | Green Body | | | Degreased Body | | | Calcined Body | | |
|---|---|---|---|---|---|---|---|---|---|
| | Wing | Paddle | Hub | Wing | Paddle | Hub | Wing | Paddle | Hub |
| 2.5 | ⊙ | ⊙ | ⊙ | ⊙ | ⊙ | ⊙ | ⊙ | ⊙ | ⊙ |
| 5.5 | ⊙ | ⊙ | ⊙ | ⊙ | ⊙ | ⊙ | ⊙ | ⊙ | ⊙ |
| 7.2 | ⊙ | ⊙ | ⊙ | ○ | ⊙ | ⊙ | ○ | ⊙ | ⊙ |
| 11.9 | ⊙ | ⊙ | ⊙ | ⊙ | ○ | ○ | ○ | △ | ○ |
| 32.6 | ○ | ⊙ | ⊙ | △ | ○ | ⊙ | X | X | △ |
| 45.3 | ○ | ⊙ | ⊙ | X | ⊙ | ⊙ | X | X | ⊙ |

(4) Strength of Sintered Ceramic Article

Figure 14:
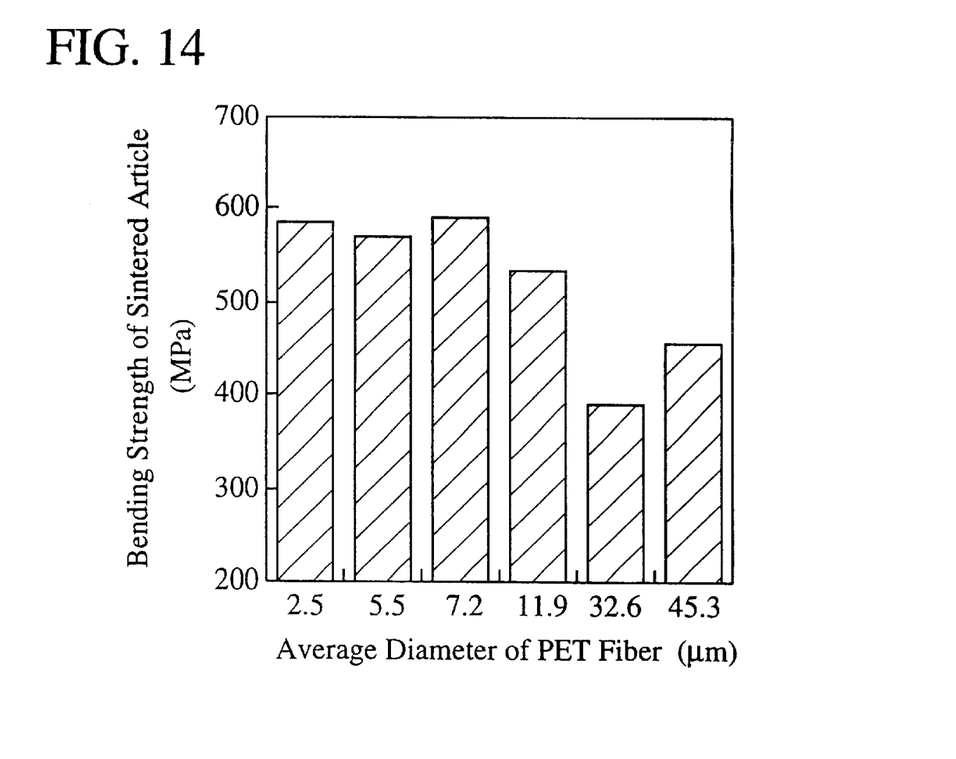
FIG. 14 is a graphical representation showing the dependency of the bending strength of the sintered ceramic article on the diameter length of PET fiber in Example 6.

The sintered ceramic articles produced from the slurries in the same manner as in Example 1(3) were subjected to the three- point bending test. The results are shown in FIG. 14. As seen from FIG. 14, the bending strength of the sintered ceramic article was low when the average diameter was larger than 30 μm.

EXAMPLE 7

(1) Preparation of Slurry

Figure 15:
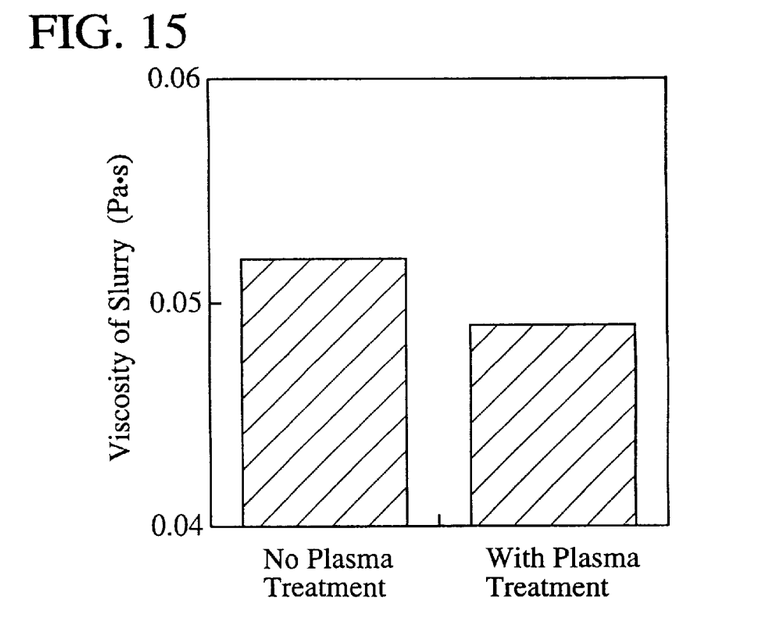
FIG. 15 is a graphical representation showing the effect of the plasma treatment of PET fiber on the viscosity of the slurry in Example 7.

In the same manner as in Example 1, a slurry was prepared except for using PET fiber (average diameter: 5.5 μm; average length: 500 μm) subjected to a plasma surface treatment. In addition, a slurry added with PET fiber not surface-treated was prepared in the same manner. The viscosity of each slurry was measured in the same manner as in Example 1. The results are shown in FIG. 15. As seen from FIG. 15, the plasma surface treatment of PET fiber decreased the viscosity of the slurry, thus improving the moldability.

(2) Evaluation of Moldability

Figure 16:
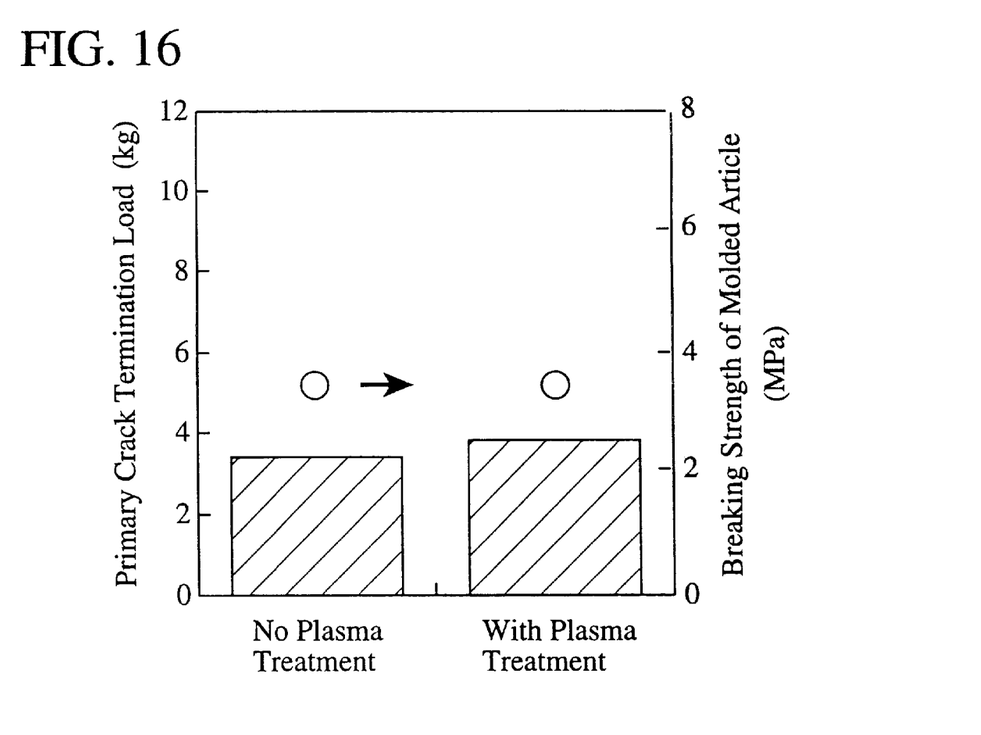
FIG. 16 is a graphical representation showing the effect of the plasma treatment of PET fiber on the primary crack termination load and the breaking strength in Example 7.

Each green body with a dimension of 100 mm×10 mm×10 mm was prepared by slip casting each slurry in the same manner as in Example 1. The green bodies were subjected to the rupture test to determine a primary crack termination load and a breaking strength. The results are shown in FIG. 16. As seen from FIG. 16, the primary crack termination load and the breaking strength were independent of the surface treatment.

(3) Strength of Sintered Ceramic Article

Figure 17:
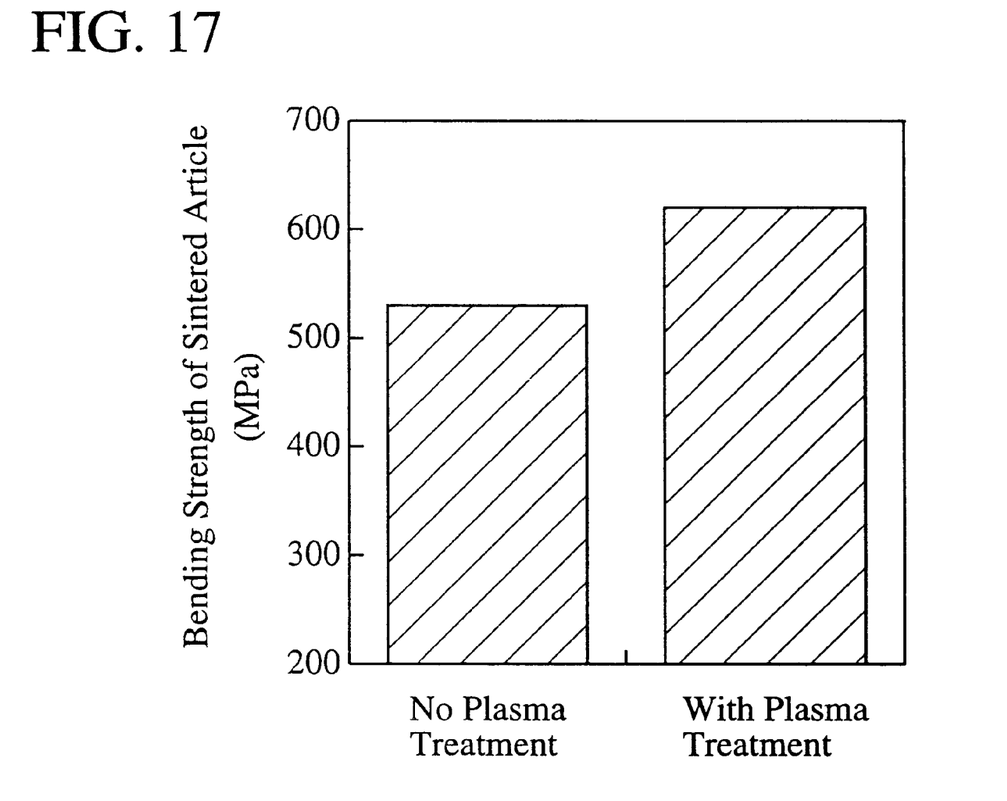
FIG. 17 is a graphical representation showing the effect of the plasma treatment of PET fiber on the bending strength of the sintered ceramic article in Example 7.

The sintered ceramic articles produced from the slurries in the same manner as in Example 1(3) were subjected to the three-point bending test. The results are shown in FIG. 17. As seen from FIG. 17, the bending strength of the sintered ceramic article was improved by the plasma surface treatment of PET fiber.

EXAMPLES 8–9

(1) Preparation of Slurry

In the same manner as in Example 1, each slurry was prepared except for using 0.6 part by weight of PET fiber having an average diameter of 5.5 μm and an average length of 500 μm (Example 8) or 0.4 part by weight of PET fiber having an average diameter of 2.5 μm and an average length of 500 μm (Example 9). The mixing time after the addition of PET fiber was 12 hours for each slurry.

(2) Occurrence of Cracking

In the same manner as in Example 1, each slurry prepared above was slip cast in a plaster mold designed to produce a buffle plate or a diffuser. The resultant green bodies were degreased, calcined and sintered in the same manner as in Example 1. No crack was detected on the green bodies and the sintered ceramic articles.

EXAMPLE 10–12

(1) Preparation of Slurry

In the same manner as in Example 1, each slurry was prepared except for using 0.6 part by weight of the same PET fiber as used in Example 8 (Example 10), 0.4 part by weight of the same PET fiber as used in Example 9 (Example 11) or 0.4 part by weight of the same plasma-treated PET fiber as used in Example 7 (Example 12). The mixing time after the addition of PET fiber was 12 hours for each slurry.

(2) Occurrence of Cracking

In the same manner as in Example 1, each slurry prepared above was slip cast in a plaster mold designed to produce an HT rotor. The resultant green bodies were degreased and calcined in the same manner as in Example 1. The calcined bodies were HIP-sintered at 1900° C. under a pressure of 1000 atm for 1.5 hours. The green bodies, degreased bodies, calcined bodies and HIP-sintered ceramic articles were examined with respect to occurrence of cracking at the wing, paddle and hub portions in the same manner as in Example 1. The results are shown in Table 6 together with the measured density of each HIP-sintered ceramic article.

TABLE 6

Crack on HT Rotor

| Example No. | Green Body | | | Degreased Body | | | Calcined Body | | |
|---|---|---|---|---|---|---|---|---|---|
| | Wing | Paddle | Hub | Wing | Paddle | Hub | Wing | Paddle | Hub |
| 10 | ⊙ | ⊙ | ⊙ | ⊙ | ⊙ | ⊙ | ⊙ | ⊙ | ⊙ |
| 11 | ⊙ | ⊙ | ⊙ | ⊙ | ⊙ | ⊙ | ⊙ | ⊙ | ⊙ |
| 12 | ⊙ | ⊙ | ⊙ | ⊙ | ⊙ | ⊙ | ⊙ | ⊙ | ⊙ |

| | HIP-Sintered Ceramic Article | | | Density of HIP-Sintered |
|---|---|---|---|---|
| Example No. | Wing | Paddle | Hub | Ceramic Article (g/cm³) |
| 10 | ○ | ⊙ | ⊙ | 3.188 |
| 11 | ○ | ⊙ | ⊙ | 3.191 |
| 12 | ○ | ⊙ | ⊙ | 3.210 |

As described above, since the organic fiber is uniformly dispersed throughout the ceramic composition, the resultant green body has an improved green strength and the occurrence of spalling and cracking on the green body is drastically reduced. As a result, an increased yield of sound ceramic green body can be attained. Also, the uniform dispersion of the organic fiber throughout the green body enables to manufacture a green body with a complicated shape having enough green strength which has been difficult to produce in the art. In addition, since the organic fiber can be easily separated form the green bodies, the ceramic powder in the defective green bodies can be reused, thus reducing the production cost. The sintered ceramic article produced from the green body has a sufficient mechanical strength for practical use and has little cracking. Therefore, the sintered ceramic article of the present invention is useful, in particular, as the automotive parts.

What is claimed is:

1. A fiber-reinforced ceramic green body containing a synthetic polymer fiber uniformly dispersed throughout said green body, said synthetic polymer fiber having an average length of 300–1,000 μm and an average diameter of 2.5–30 μm in an amount of 0.2–3 parts by weight based on 100 parts by weight of a total of the ceramic powder.

2. The fiber-reinforced ceramic green body according to claim 1, wherein said ceramic green body is produced by slip-casting a ceramic composition containing said synthetic polymer fiber.

3. The fiber-reinforced ceramic green body according to claim 1 or claim 2, wherein said synthetic polymer fiber is a polyester fiber or a nylon fiber.

4. The fiber-reinforced ceramic green body according to claim 1 or claim 2, wherein said synthetic polymer fiber has a hydrophilic nature imparted by surface treatment.

5. A fiber-reinforced ceramic green body containing a synthetic polymer fiber uniformly dispersed throughout said green body, wherein said ceramic green body comprises a ceramic powder, a sintering aid powder, said synthetic polymer fiber and a dispersant.

6. The fiber-reinforced ceramic green body according to claim 5, wherein the amount of said synthetic polymer fiber is 0.2–3 parts by weight based on 100 parts by weight of a total of a ceramic powder and a sintering aid powder.

7. A fiber-reinforced ceramic green body containing a synthetic polymer fiber uniformly dispersed throughout said green body, wherein said ceramic green body is produced by slip casting a ceramic composition comprising a ceramic posder, 0.5–15 parts by weight of a sintering aid powder, 0.2–3 parts by weight of said synthetic polymer fiber, 35–50 parts by weight of an aqueous dispersion medium, and 0.05–0.5 part by weight of a dispersant, each of said amount in terms of part by weight based on 100 parts by weight of a total of said ceramic powder and said sintering aid powder.

8. The fiber-reinforced ceramic green body according to claim 1 or claim 2, wherein degreasing of said green body is carried out at 550–650° C. for 1–5 hours.

9. The fiber-reinforced ceramic green body according to claim 5, wherein the amount of said sintering aid powder is 0.5–15 parts by weight based on 100 parts by weight of a total of a ceramic powder and the sintering aid powder.

10. The fiber-reinforced ceramic green body according to claim 3, wherein said synthetic polymer fiber is selected from the group consisting of nylon 6, nylon 66 and polyethylene terephthalate.

11. The fiber-reinforced ceramic green body according to claim 5, wherein said ceramic powder is α-silicon nitride or β-silicon nitride.

12. The fiber-reinforced ceramic green body according to claim 5, wherein said sintering aid powder is at least one selected from the group consisting of $Al_2O_3$, $Y_2O_3$, $Yb_2O_3$, $HfO_2$, AlN and MgO.

13. The fiber-reinforced ceramic green body according to claim 5, wherein said ceramic powder has an average particle size of 0.01–3 μm and a specific surface area of 9–13 $m^2/g$.

14. The fiber-reinforced ceramic green body according to claim 5, wherein said sintering aid powder has an average particle size of 0.1–8 μm and a specific surface area of 1–15 $m^2/g$.

* * * * *